United States Patent
Moghe et al.

(10) Patent No.: US 11,240,117 B2
(45) Date of Patent: **\*Feb. 1, 2022**

(54) INTELLIGENT ANALYTIC CLOUD PROVISIONING

(71) Applicant: Cazena, Inc., Waltham, MA (US)

(72) Inventors: Pratyush Moghe, Acton, MA (US); Peter Thomas Smith, Mansfield, MA (US); Craig Steven Harris, Chestnut Hill, MA (US); Mineharu Takahara, Natick, MA (US); Lovantheran Chetty, Somerville, MA (US); Daniel Dietterich, Cambridge, MA (US)

(73) Assignee: Cazena, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,229

(22) Filed: Apr. 1, 2019

(65) Prior Publication Data

US 2019/0230000 A1    Jul. 25, 2019

Related U.S. Application Data

(63) Continuation of application No. 14/595,700, filed on Jan. 13, 2015, now Pat. No. 10,250,451.

(Continued)

(51) Int. Cl.
*H04L 12/24* (2006.01)
*H04L 12/26* (2006.01)

(52) U.S. Cl.
CPC .......... *H04L 41/14* (2013.01); *H04L 41/0893* (2013.01); *H04L 41/0896* (2013.01);

(Continued)

(58) Field of Classification Search
CPC ................ H04L 41/14; H04L 41/0893; H04L 41/0896; H04L 41/145; H04L 41/147;
(Continued)

(56) References Cited

U.S. PATENT DOCUMENTS

| 7,752,301 B1 * | 7/2010 | Maiocco | ................ H04L 41/064 709/224 |
| 2008/0262823 A1 * | 10/2008 | Oslake | ...................... G06F 8/20 703/22 |

(Continued)

*Primary Examiner* — Blake J Rubin
(74) *Attorney, Agent, or Firm* — David H. Judson (57) ABSTRACT

A services platform acts as an intermediary between an existing enterprise analytic environment, and one or more underlying cloud service providers. The platform provides enterprise "big data-as-a-service," by which an enterprise can seamlessly and easily provision new capacity for processing its analytic workload, and migrate data sources (e.g., data warehouse marts, enterprise data warehouses, analytic sandboxes, and the like) to the cloud for processing. The platform provides end-to-end enterprise class manageability of enterprise data assets, from data collection, aggregation, movement, staging and processing, all while providing service levels, security, access and governance. The platform integrates directly but seamlessly into the enterprise analytic stack, and existing analytics applications work as normal. The platform provides a way for the enterprise to translate its workloads into clusters of compute resources that meet its service level requirements.

15 Claims, 6 Drawing Sheets

Related U.S. Application Data (60) Provisional application No. 61/926,422, filed on Jan. 13, 2014.

(52) U.S. Cl.
CPC .......... *H04L 41/145* (2013.01); *H04L 41/147* (2013.01); *H04L 41/22* (2013.01); *H04L 41/5035* (2013.01); *H04L 41/5041* (2013.01); *H04L 43/0888* (2013.01); *H04L 41/5096* (2013.01)

(58) Field of Classification Search
CPC ................ H04L 41/22; H04L 41/5035; H04L 41/5041; H04L 41/5096; H04L 43/0888
See application file for complete search history.

(56) References Cited

U.S. PATENT DOCUMENTS

| | | | | |
|---|---|---|---|---|
| 2011/0320233 A1* | 12/2011 | Arnette | .................. | H04L 47/70 705/7.15 |
| 2012/0079497 A1* | 3/2012 | Gangemi | .............. | G06F 9/5011 718/104 |
| 2012/0239739 A1* | 9/2012 | Manglik | ............... | G06F 9/5077 709/203 |
| 2012/0246324 A1* | 9/2012 | Kan | .................... | G06F 11/3433 709/226 |
| 2013/0042007 A1* | 2/2013 | Linton | .................. | G09B 19/00 709/226 |
| 2013/0185433 A1* | 7/2013 | Zhu | .................... | H04L 43/0882 709/226 |
| 2013/0185729 A1* | 7/2013 | Vasic | ................... | G06F 9/5072 718/104 |
| 2013/0290536 A1* | 10/2013 | Dutta | ................... | G06F 9/5027 709/226 |
| 2014/0025822 A1* | 1/2014 | Guha | ................... | G06F 9/5038 709/226 |
| 2014/0047341 A1* | 2/2014 | Breternitz | .............. | G06F 9/505 715/735 |
| 2014/0200036 A1* | 7/2014 | Egner | .................. | H04W 64/00 455/456.3 |
| 2015/0067171 A1* | 3/2015 | Yum | .................... | H04L 67/2809 709/226 |

* cited by examiner

INTELLIGENT ANALYTIC CLOUD PROVISIONING

BACKGROUND OF THE INVENTION

Technical Field

This disclosure relates generally to data analytics and, in particular, to a services platform upon which enterprises may execute their data analytic workloads in a secure and cost-efficient manner.

Background of the Related Art

"Big Data" refers to collections of data sets that are too large and complex for processing (e.g., analysis and visualization) using conventional database management tools or traditional data processing applications. On-premise "big data" analytic environments typically are predicated on enterprises "developing" or purchasing complete analytic infrastructure, whether via software, hardware (storage, compute, networking), or appliances. Subsequently, this infrastructure has to be deployed, maintained, and extended, requiring further significant investments and time delay. This dependence "slows" down the agility of the enterprises. Simple new projects for exploring analytics of newly procured data can take months if not longer.

Classic cloud analytic environments (such as Amazon® AWS, Rackspace® and others) provide the enterprise an alternative to on-premises analytics and, in particular, by offering infrastructure on which to deploy clusters for analytics. Using cloud computing, virtual clusters of machines theoretically may be provisioned as needed, growing and shrinking elastically to respond to changing demands. The enterprise has the option of paying only for the resources it uses, and only when it uses them. With cloud support, total costs theoretically can be reduced, with capital investments traded for operational expenses.

The promise of a better economic future in the cloud is complicated by the question of what types of virtual computing nodes to provision. On the one hand, enterprises want to reduce costs and increase flexibility. On the other hand, enterprises have expectations about performance, availability, security, compatibility and other factors that are important to their success. Whether explicitly or implicitly, enterprises commonly enter into service level agreements (SLAs) with their stakeholders and, accordingly, must provide the same experience in the cloud as with dedicated, on-premises hardware.

Cloud vendors typically offer an array of different types of virtual computing nodes. For example, vendors may offer high-memory and fast CPU for "compute-intensive" needs, or fast storage with high IOPS for "database-type" applications. It is common to find dozens of different configurations, at varying prices, providing differing bundles of resources. These options are described in the language of the cloud-vendor, such as: "16 GB RAM", "2 virtual cores", "moderate I/O performance," and so forth. The cloud vendor-specified options, however, do not translate well within the context of an enterprise SLA. Indeed, typically the enterprise wants the least-expensive options that meet its SLAs, which might be configured as: "deliver the report by 8 A.M.," "ensure that the system is available 24×7," "answer ad-hoc questions within 2 seconds 90% of the time," and so forth. There is a vast gulf between these descriptions, and at present, and typically the onus is on the enterprise to bridge the gap.

There remains a need to provide techniques by which an enterprise can translate its workloads into clusters of virtual node types that meet its (the enterprise's) SLAs at reasonable cost.

BRIEF SUMMARY

The techniques herein provide a way to normalize the notion of computing resources, so as to enable mapping the resources required by an enterprise's workload onto the resources provided by clusters of virtual nodes. In particular, the subject matter herein provides an intelligent resource provisioning system that optimizes cloud infrastructure to accommodate workloads at given cost(s) and service level agreement(s).

Preferably, the techniques herein are practiced on or in association with a services platform that acts as an intermediary between an existing enterprise analytic environment, and one or more underlying cloud service providers. The platform provides an enterprise "big data-as-a-service" ("EBDaaS"), by which an enterprise can seamlessly and easily provision new capacity for processing its analytic workload, and migrate data sources (e.g., data warehouse marts, enterprise data warehouses, analytic sandboxes, and the like) to the cloud for processing.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). Typically, a cloud computing infrastructure may comprise co-located hardware and software resources, or resources that are physically, logically, virtually and/or geographically distinct. Communication networks used to communicate to and from the platform services may be packet-based, non-packet based, and secure or non-secure, or some combination thereof.

Preferably, the techniques herein are implemented in a big data "as-a-service" platform. As described in Ser. No. 14/581,188, filed Dec. 23, 2014, the disclosure of which is hereby incorporated by reference, the platform preferably operates in association with, on the one hand, an enterprise analytics data infrastructure, and, on the other hand, a cloud computing infrastructure. A "customer" or "user" of the platform typically is an enterprise that desires to execute an analytics application "workload" against a set of enterprise data. Typically, the enterprise data comprises one or more data sources, and the notion of "enterprise data" is not necessarily limited to data that is actually sourced from the enterprise. The service platform acts as an intermediary between the enterprise analytics data infrastructure (which, typically, is "on-premises") and the underlying cloud compute resources that are to be provisioned and utilized by the enterprise for executing the workload. Typically, a "workload" as used herein refers to the operations that are performed by the analytics applications with respect to the enterprise data. That "workload" gets executed in the "cloud," but in a seamless and efficient manner. In this way, both the enterprise data itself and the analytics operations on that data are off-loaded to the cloud, but in a manner that provides the enterprise customer with only the amount of "resources" needed for the workload, and in a reliable and cost-effective manner.

The services platform described may itself be part of the cloud compute infrastructure, or it may operate as a stand-alone service that executes in association with third party cloud compute services, such as Amazon® AWS, Microsoft® Azure, IBM® SoftLayer®, and others. The platform comprises hardware, software, database and other computing resources as necessary to facilitate the functionality described herein.

In one embodiment, the platform is located between the enterprise and one or more cloud service providers that provide cloud compute resources. The platform provides a user console for provisioning and managing. Using the console, an end user (e.g., an enterprise administrator) creates a customer account and captures a basic set of information (e.g., type of data to be moved, volume of data, type of workload engine, a required service level, etc.) for the analytics workload to be processed. Based on the information provisioned in the user console, the platform executes a resource provisioning mechanism that automatically instantiates a "data cloud" within or across the third party cloud compute resources. From the user's perspective, the data cloud is instantiated transparently, as the end user does not need to interact directly with the cloud service provider(s) or have any knowledge about those resources. Preferably, the data cloud comprises a cloud layer (e.g., storage, compute nodes, networking, and other cloud resources) to support the workload, together with provisioning of one or more workload engines (e.g., databases) into which the enterprise data will be moved. Once the data cloud is instantiated, a set of one or more data movers collects and moves data from particular enterprise data sources into the data cloud. Following instantiation of the data cloud and movement of the enterprise data into the workload engine, an analytics application workload is executed against the enterprise data. For example, if the analytics application is a business intelligence reporting tool, the tool is pointed to the data cloud. The tool then generates queries against the enterprise data in the data cloud, and (in lieu of executing in the enterprise environment) these queries execute in the data cloud as the workload.

In the context of this disclosure, typically the enterprise analytics infrastructure is a standard analytic stack data flow comprising one or more data warehouses or data marts, ETL processes, workload engines (e.g., databases such as Hadoop, MPP SQL, Search or Spark), and analytics applications, such as business intelligence tools, advanced analytics tools, and the like. As is well known, a data warehouse, sometimes referred to an enterprise data warehouse (EDW), is a system used for reporting and data analysis. Data warehouses are central repositories of integrated data from one or more disparate sources. Typically, they store current and historical data. A data mart is a type of data warehouse that is focused on a single subject or functional area. Data marts usually draw data from only a few sources, such as internal operational systems, a central data warehouse, or external data. An extract-transform-load (ETL) process provides staging, data integration, and access layers. The staging layer stores raw data extracted from each of the disparate source data systems. The integration layer integrates the disparate data sets by transforming the data from the staging layer. The integrated data are then moved to the data warehouse database, where the data is arranged, typically into hierarchical groups. The access layer helps users retrieve data. The particular details of the enterprise data analytics layer is not a limitation of this disclosure, as the services platform is designed to operate with any type of components that may comprise the enterprise data analytics environment.

Multiple enterprise customers use the services platform to offload data analytics workloads to "data clouds" that are intelligently provisioned and managed by the services platform. Each customer's workload may be executed in the cloud securely and privately, and in a manner that, for a given customer, meets a service level objective and cost.

Intelligent Analytic Cloud Provisioning

With the above as background, the techniques of this disclosure are now described.

Figure 1:
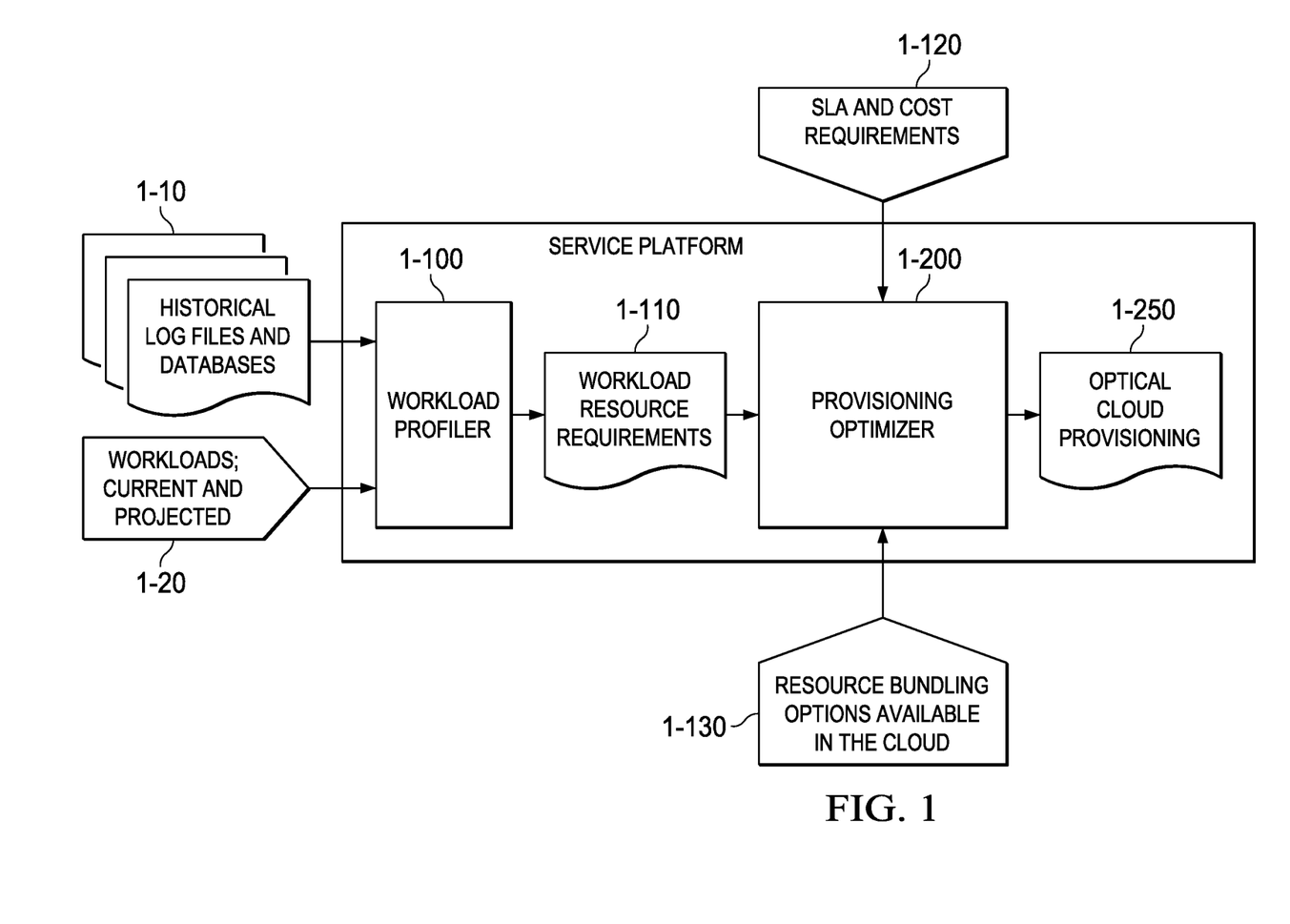
FIG. 1 depicts a system for optimally provisioning resources in the cloud by matching workload resource requirements to resource bundling options available in the cloud.

FIG. 1 depicts a system for optimally provisioning resources in the cloud by matching workload resource requirements to resource bundling options available in the cloud. The system preferably is implemented in software, e.g., as a set of computer programs and processes, and associated data structures, executing in one or more machines having hardware processing elements.

In this system, a workload profiler 1-100 accepts historical workload information comprising a plurality of database log files, application log files, and query system views 1-10, along with actual and projected workloads 1-20; and produces a description of the workload resource requirements 1-110. A provisioning optimizer 1-200 accepts the profiled workload resource requirements 1-110, along with service level agreements and cost requirements 1-120, and descriptions of the resource bundling options available in the cloud 1-130, and calculates the optimal cloud provisioning 1-250.

In one embodiment the workloads referenced in 1-20 and 1-110 comprise a set of database queries.

In one embodiment the historical log files and databases 1-10 comprise descriptions of specific database queries, such descriptions comprising an identifier and text of a database query, the time the query was submitted and the time it completed, an execution plan for the query comprising a number of database operations, the estimated and actual costs and resources required for each database operation in the execution plan. The historical log files and databases 1-10 may also comprise aggregated information about queries submitted over a period of time, such aggregated information comprising the number and total amount of time and total resources used by all queries over the period of time, grouped by type of resource and by database operation. By way of example, this aggregated information may indicate the total number of sequential disk scan operations across all queries over a period of time, along with the total number of bytes scanned, and the total time required to do the scanning.

In one embodiment, the service level agreements 1-120 comprise a plurality of performance specifications. A performance specification may indicate a scheduling requirement as the time at which a particular workload is to complete. A performance specification may indicate a latency requirement as a percentage of cases in which a workload is to complete within a given amount of time after it is submitted. A performance specification may indicate a throughput requirement as the number and type of workloads to be completed within a period of time. With each specification in the service level agreements 1-120, there is a cost associated with failure to satisfy the condition. These costs may be arbitrary functions of both the size and the duration of the failure.

In one embodiment, the resource bundling options available in the cloud 1-130 are derived by accessing public APIs provided by commercial cloud vendors and stored in database tables, whose columns indicate a cloud vendor, a locale, a resource-bundling-name, and a description of the types and amounts of resources provided in the bundling option. The resources comprise, for example and without limitation: compute resources, memory resources, disk resources and network resources, and the like. The compute resources comprise, for example and without limitation: number of cores, cycle time (GHz) and operations per second, processor type and instruction set (such as GPU/CUDA or CPU/ix86 or FPU), and the like. The memory resources comprise, for example and without limitation: memory level (L1 cache, L2 cache, L3 cache, general memory, and the like), #bytes-per-level, time to move data from memory level to processing unit, and the like. The disk resources include, for example and without limitation: type (SSD, magnetic disk), capacity in byte, read seek time, write seek time, #bytes/sec for reads and writes, IOPS, and the like. The network resources comprise, for example and without limitation: network type, #bytes/sec, and the like.

In one embodiment, the optimal cloud provisioning 1-250 comprises a list of available provisioning options, ordered from best to worst, where each option comprises a workload description, a cloud provider, cloud locale, a number and type of virtual computational nodes, and a number and type of storage options. The term "optimal" is not intended to be limiting. The workload description comprises any or all of the workloads described by 1-10 and 1-20. The cloud provider may be a commercial vendor or a private on-premises cloud. The cloud locale describes the geographical region in which the cloud is to be provisioned. The type of virtual computational is a specific bundling of computational resources; and a storage option is a specific bundling of storage capacity and performance. In an embodiment supporting elasticity, the provisioning options further comprise range information describing the minimum, maximum and average number of virtual computational nodes of given types, along with the standard deviation.

Figure 2:
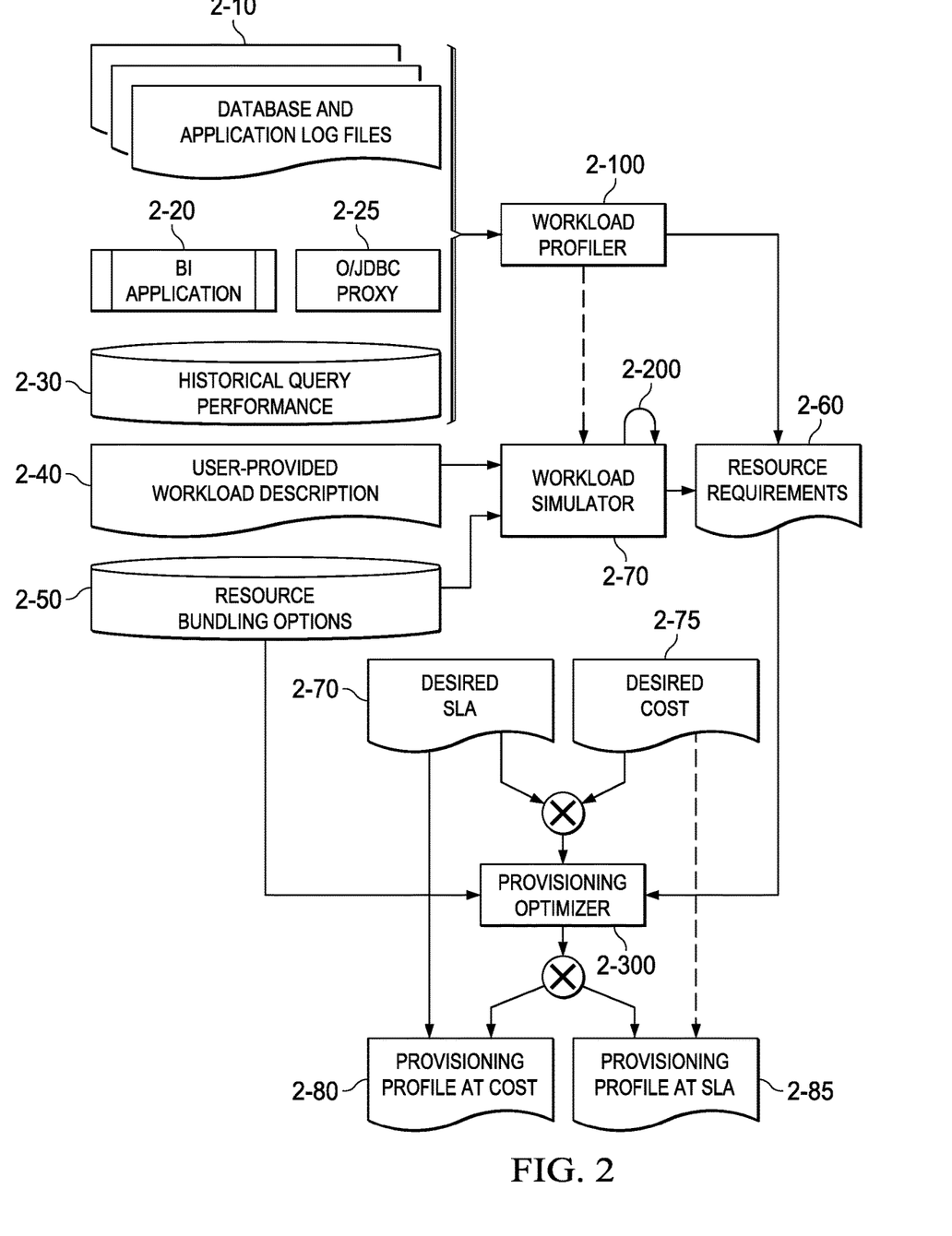
FIG. 2 elaborates on FIG. 1, depicting in more detail a system for optimizing resource provisioning that accommodate workloads at given costs and service level agreements.

FIG. 2 elaborates on FIG. 1, depicting a system for optimizing resource provisioning that accommodate workloads at given costs and service level agreements, comprising a Workload Profiler 2-100, a Workload Simulator 2-200 and a Provisioning Optimizer 2-300.

Preferably, the Workload Profiler 2-100 consumes inputs comprising Database and Application Log Files 2-10, Business Intelligence Applications 2-20 connected to specialized O/JDBC proxies 2-25, and databases containing historical query performance 2-30. From these inputs, the Workload Profiler 2-100 deduces the resources that have historically been required to support existing workloads, and records these as Resource Requirements 2-60.

Preferably, the Workload Simulator 2-200 consumes a user-provided workload description 2-40, and it performs a pro-forma simulation of the resources required to support that workload, recording these as Resource Requirements 2-60. In one mode of operation, the Workload Simulator 2-200 also is informed by the analysis of historical workloads produced by the Workload Profiler 2-100.

Preferably, the Provisioning Optimizer 2-300 combines the Resource Requirements 2-60 with available Resource Bundling Options 2-50. In one mode of operation, the Provisioning Optimizer 2-300 also accepts a desired SLA 2-70, and produces a provisioning profile 2-80, that meets the desired SLA 2-70 at a given cost. In another mode of operation, the Provisioning Optimizer 2-300 also accepts a desired cost 2-75, and produces a provisioning profile 2-85 that meets the desired cost 2-75 at a given SLA.

Figure 3:
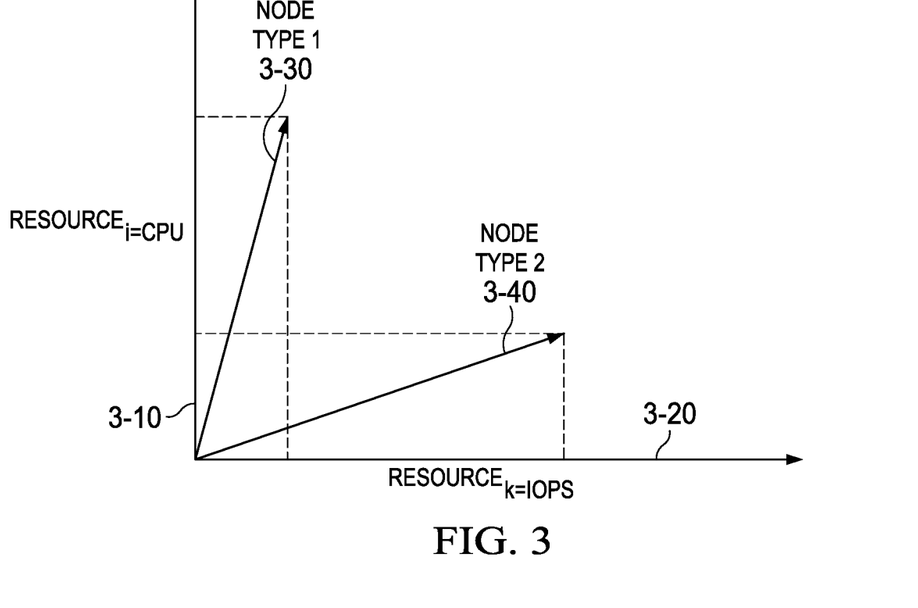
FIG. 3 depicts a mapping of available resource bundles onto a multi-dimensional vector space.

FIG. 3 depicts a mapping of available resource bundles onto a multi-dimensional vector space. The figure shows only two of many resource dimensions. In this example, the vertical axis 3-10 represents resource-i, a measure of CPU power. The horizontal axis 3-20 represents resource-k, a measure of I/O operations per second. Not depicted in the figure, but relevant to the disclosure, are dimensions for resources including disk-capacity, disk-seek-time, #bytes-per-second, solid-state-disk access time, solid-state-disk #bytes-per-second, RAID, MTBF, amount of RAM, RAM bus speed, size of L3, L2, L1 caches, speed of accessing memory and L3, L2, L1 caches, number CPUs, number cores per CPU, availability of hyper-threading, CPU GHz, availability of CPU vector processing, availability of GPU and GPU performance, network bandwidth, available network protocols, RDMA, etc. In addition to dimensions for computational resources cited above, there may be dimensions for monetary cost, such as /hour, geographical location, and other information that contextualizes the availability of the resource bundles. FIG. 3 also depicts two particular resource bundles. NodeType1 3-30 is a bundle that includes relatively more CPU and relatively less IOPS. NodeType2 3-40 is a bundle that includes relatively more IOPS and relatively less CPU. These are merely examples. In actual practice, there may be many available resource bundles, each providing different amounts of differing resources. Generalizing, each of these resource bundles can be represented as a vector in a multi-dimensional resource space.

Figure 4:
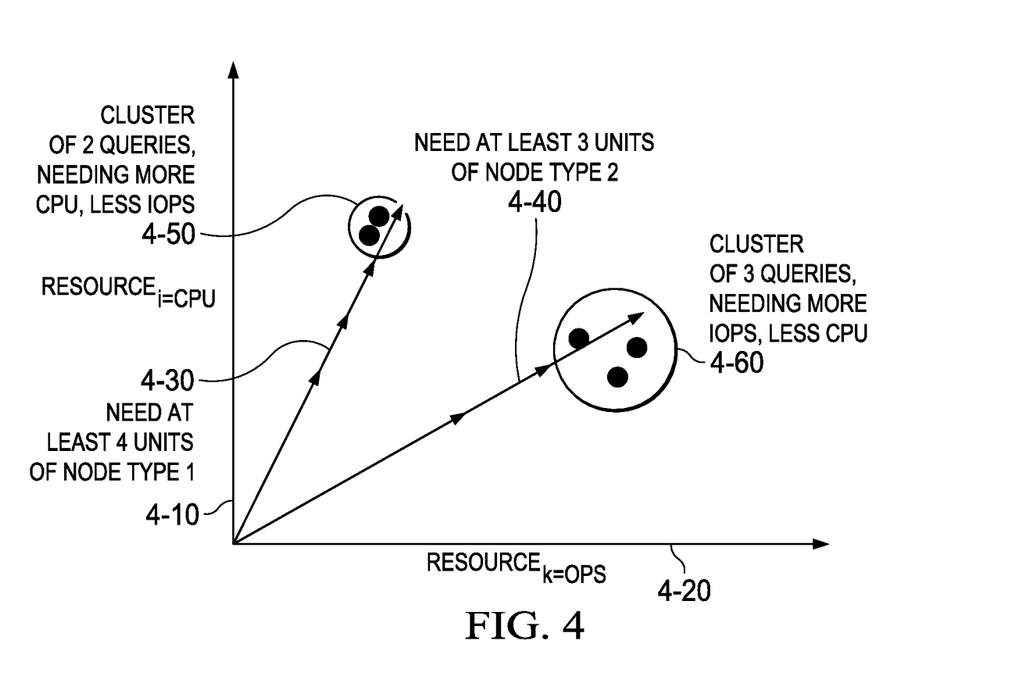
FIG. 4 also depicts a multi-dimensional resource vector space, and in which workload resource requirements are represented as circles.

FIG. 4 also depicts a multi-dimensional resource vector space, and in which workload resource requirements are represented as circles. As depicted, two workloads 4-50 cluster closely together, requiring roughly similar resources. Three other workloads 4-60 also cluster together, although not as tightly as those in 4-50. The dimensions used to represent resource requirements in FIG. 4 are the same as those used to represent resource availability in FIG. 3. Although not depicted in FIG. 4, there is additionally a temporal dimension, describing the start and end points over which the resources are required. A person of ordinary skill will appreciate that queries also can be viewed as points in the resource space, where queries needing similar resources cluster together.

A goal of the approach herein is to find combination(s) of node types that meet resource nodes at minimum cost.

Thus, for example, if a workload is parallelizable and requires R units of a resource, and if a resource-bundle provides P units of that resource, then the workload's resource needs can be met by some number of units U of the resource-bundle, where U is at least R divided by P and rounded up to the nearest integer. Because a workload often requires many types of resources, its needs are met when U is large enough to provide for all of its required resources. Thus, the resources required by the cluster of workloads in 4-50, could be met by 4 units of the resource-bundles provided by NodeType1 4-30. Similarly, the resource required by the cluster of workloads in 4-60, could be met by three units of the resource-bundles provided by NodeType2 4-40.

To provide adequate resources for all five workloads using just one type of resource bundle might require significantly more units at a greater cost than can be achieved by matching several resource-bundles to different clusters of requirements.

Figure 5:
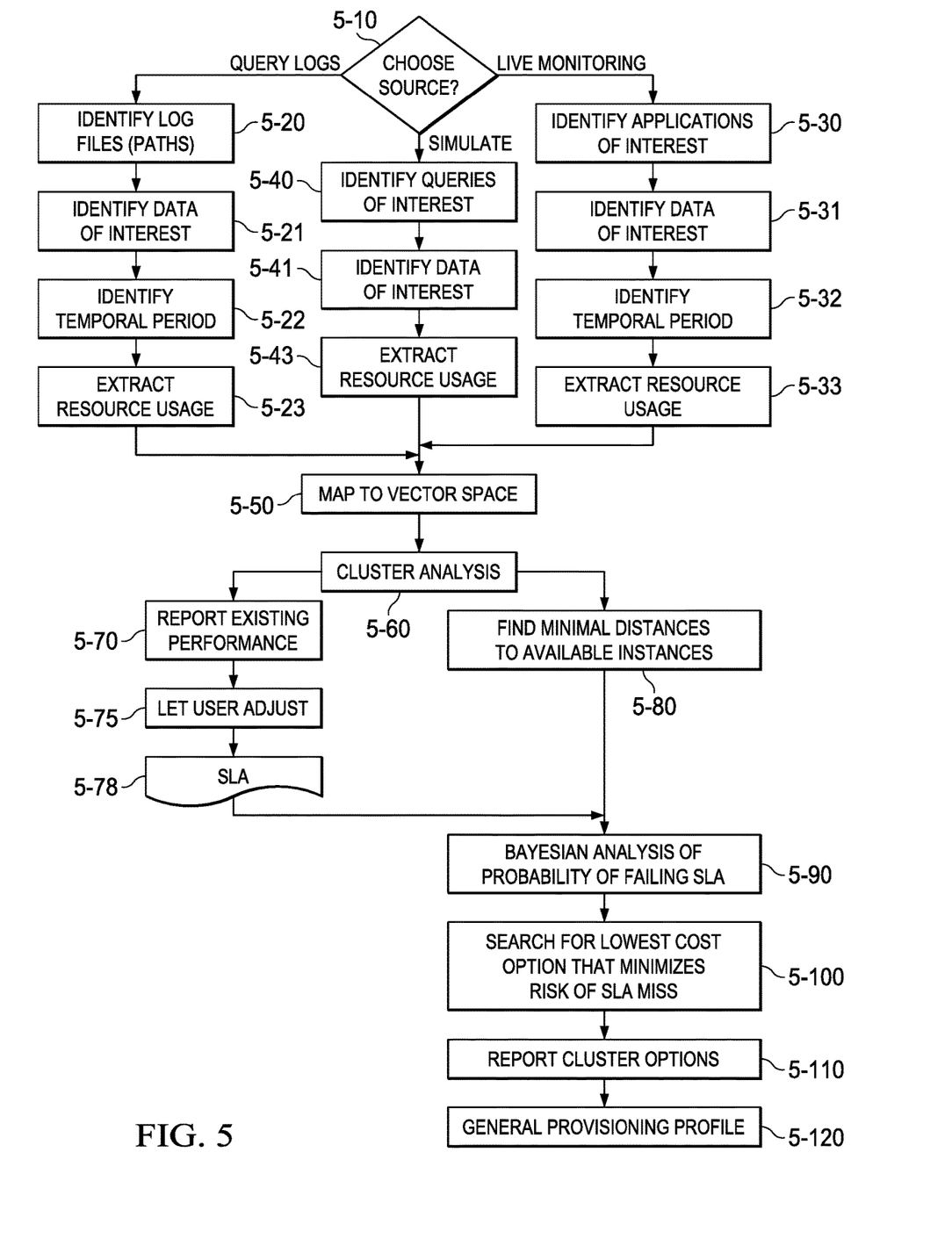
FIG. 5 is a detailed process flow diagram that depicts the steps involved in the system shown in FIGS. 1 and 2.

FIG. 5 elaborates the steps involved in the system shown in FIGS. 1 and 2. In step 5-10, the user decides what types of workload information to provide. The three basic options, which may be combined, are to examine historical data, to monitor the live operation of applications, or to simulate resource requirements from a summary description of a workload.

Steps 5-20 through 5-23 operate on historical information, which may be encapsulated in query log files, application log files, or (not shown) in database tables that record historical query performance. These steps elaborate the connection between 2-10 and 2-100 in FIG. 2.

Steps 5-30 through 5-33 monitor live applications, and elaborate the connection between 2-20 and 2-100 in FIG. 2.

Steps 5-40 through 5-43 simulate workload resource requirements, and elaborate the pathway from "user-provided workload description" 2-40 to "workload simulator" 2-200. This pathway may be used pro-forma for workloads not yet developed, or when the requirements of a production system limit access to either historical data or live application monitoring.

The resources extracted from steps 5-23, 5-33 and 5-43 are inputs into step 5-50, which maps the resource requirements into a resource vector space, as described in FIG. 4.

The result of step 5-50 is depicted in as the two small circles in 4-50 and the three small circles in 4-60.

Step 5-60 performs a cluster analysis on the vectors produced by step 5-50. The result of step 5-60 is illustrated in FIG. 4 as the outer circles 4-50 and 4-60.

The results of the cluster analysis 5-60 are used to generate a report 5-70 on the user's workloads. In addition to indicating cluster boundaries and resource requirements, the report preferably also characterizes historical, monitored, and/or simulated performance. This performance characterization may then form the basis of a draft SLA, which describes the performance characteristics that have historically occurred, or that have been monitored in live applications, or that have been simulated. In step 5-75, the user may adjust the generated SLA to incorporate the relative priority and importance of the different workloads, and to balance performance against cost. The result of 5-75 is an SLA 5-78.

Additionally, the result of the cluster analysis 5-60 preferably is matched against the available resource-bundles in step 5-80. As described in the discussion of FIG. 4, step 5-80 computes the number of units of different resource-bundles required to meet the needs of the clusters identified in 5-60, preferably over the combined temporal durations of the workloads in the cluster.

The result of step 5-80 is set of lists of units of resource-bundles. In one embodiment, for each cluster, there will be a list detailing the number of units of different types of resource-bundles, ordered by increasing cost. Additionally, preferably there is another list without regard to cluster boundaries, such that all workload resource requirements can be met by some number of units of a single type of resource-bundle, with the lowest cost option listed first.

In step 5-90, the possible combinations of resource-bundles and workload clusters produced by step 5-80 is combined with the SLA in 5-78 to determine the probability that the provisioned resource-bundles will pass or fail the requirements indicated in the SLA. In one embodiment, this probability is assessed using Bayesian methods.

In some situations, it may be preferable to incur the cost penalties associated with failing the SLA in a limited way than it would be to provision a system that had a very low probability of ever failing the SLA. Step 5-100 searches for the lowest cost option. In one embodiment, this search uses the A* algorithm proposed by Nils Nilsson.

The result of step 5-100 is an ordered list of provisioning options, starting with the lowest cost option that includes estimates of probabilities of missing the SLA. Step 5-110 preferably reports these options the user, so that the user can choose between cost and SLA. In step 5-120, the user's choice is transformed into a format that can be used to automatically provision the resources needed to support the user's workloads at the given costs and SLAs.

In an alternative embodiment, which is not depicted in FIG. 5, the user can provide a monetary cost in step 5-78 rather than an SLA. In this embodiment, steps 5-90 and 5-100 would find the best SLA that could be supported at the given cost. This corresponds to pathway from 2-75 through 2-300 to 2-85 in FIG. 2.

Figure 6:
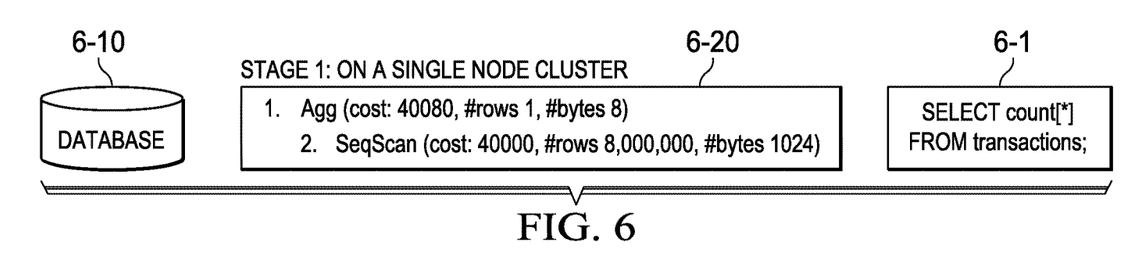
FIG. 6 depicts a simple analytic query that counts the number of transaction records in a table stored in a single database without the techniques of this disclosure.

FIG. 6 depicts a simple query 6-1 that counts the number of transaction records in a table stored in a single database 6-10. In this example, the query plan 6-20 for this query comprises a single stage comprised of two phases: an aggregation phase and a sequential scan phase. In this example, the sequential scan phase retrieves eight million transaction rows, averaging 1024 bytes each. An arbitrary cost of 40,000 cost-units is estimated for this phase. The aggregation phase examines the eight million transaction records produced by the sequential scan phase and produces a single row result that is 8 bytes in length. An arbitrary additional cost of 80 cost-units is estimated for this phase, for a total cost of 400080 cost-units.

Figure 7:
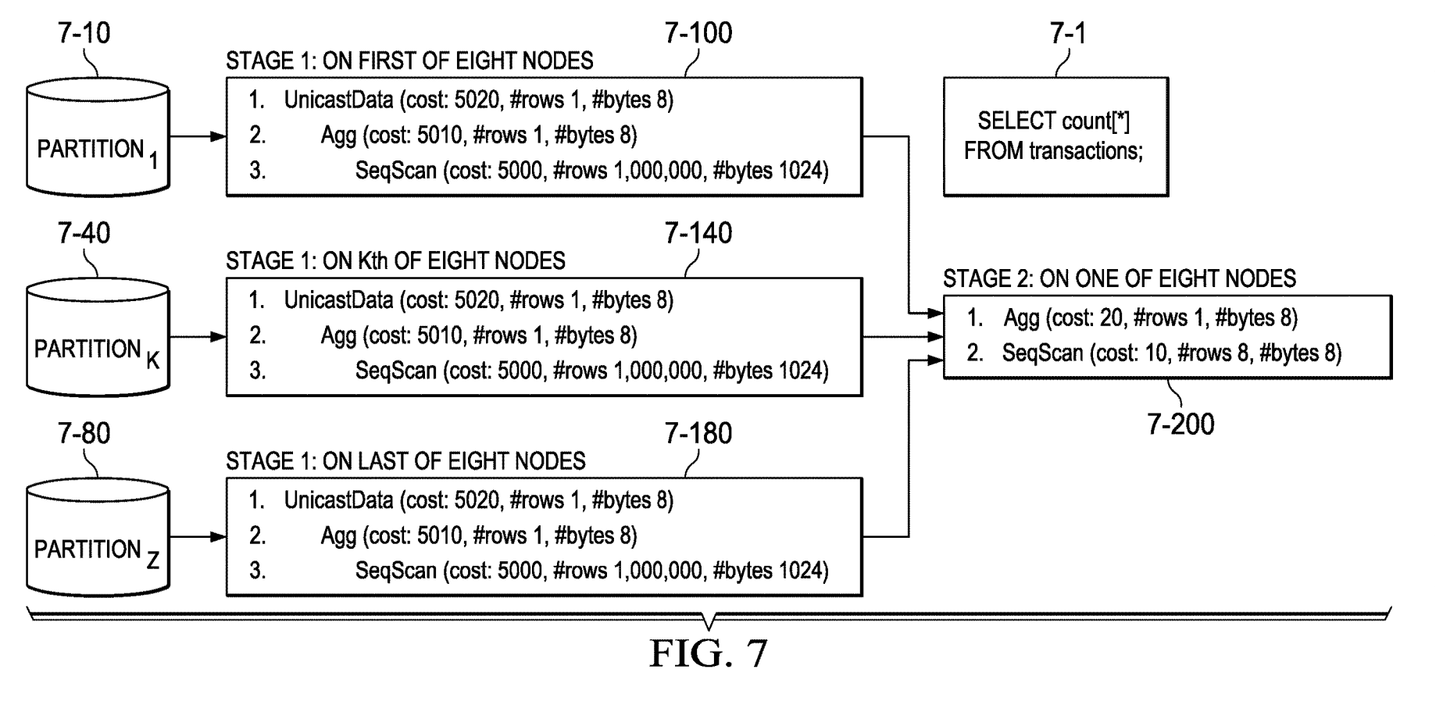
FIG. 7 depicts the same simple query as in FIG. 6 wherein the underlying transaction records are now partitioned across eight nodes.

FIG. 7 depicts the same simple query 7-1 as in FIG. 6. But, the same underlying transaction records are now partitioned across eight nodes, comprising a first partition 7-10, an arbitrary Kth partition 7-40, and a final partition 7-80. The query plan for 7-1 now comprises two stages. The first stage is executed in parallel across the eight-node cluster, so that the first node executes 7-100, an arbitrary Kth node executes 7-140 and a final node executes 7-180. The first stage 7-140 comprises three phases: a unicast phase, an aggregation phase and a sequential scan phase. Whereas in FIG. 6 the query plan 6-20 produced eight million transaction rows, the sequential scan phase in 7-140 produces one million rows, with one eighth the cost of the sequential scan in 6-20. Upon completion of the aggregation phase of 7-140, a Unicast Data phase sends the single eight-byte row to one of the eight nodes for processing stage 2 7-200. Only one of the eight nodes will execute stage 2 7-200, but any of the eight nodes can perform this function. In one embodiment if the Kth node is chosen to perform stage 2, then the results from stage 1 on the Kth node will be forwarded to stage 2 on the same node, through memory, rather than looping back over the network. In stage 7-200, one phase will receive the data sent by the nodes in stage 1, receiving one row from each node for a total of eight rows, each eight bytes long. These eight rows will then feed into a grand tally aggregation phase, producing a single row comprising the count of the transaction rows from each of the nodes in the eight-node cluster. The skilled person will understand that the specific numbers are purely for illustration, that actual clusters may comprise different numbers of nodes with different cost and resource usage.

Accordingly, the techniques herein provide for a system to translate workloads and service level agreements (SLAs) and desired cost ceilings into clusters of virtual nodes that are resourced to support the workloads and SLAs at minimum cost.

In one embodiment, the system comprises a Workload Profiler 2-100, a Workload Simulator 2-200, and a Provisioning Optimizer 2-300. These may be distinct components, or the functions may be integrated. Taken together, the Workload Profiler 2-100 and the Workload Simulator 2-200 transform a set of inputs comprising a plurality of database and application log files 2-10, business intelligence applications 2-20, databases of historical query performance 2-30, user-provided workload descriptions 2-40 and desired SLAs 2-70 into a description of the Resource Requirements 2-60 necessary to support the workloads and SLAs. The Resource Requirements 2-60 identified by the Workload Profiler 2-100 and the Workload Simulator 2-200, along with cloud-vendor provided Resource Bundling Options 2-50, desired SLAs 2-70 and Desired Costs 2-75, preferably are inputs to the Provisioning Optimizer 2-300, which searches for ways to match resource availability to resource requirements that minimize costs, and produces descriptions of the number and type of resource bundling options 2-50 that will support the workloads and SLAs 2-70.

The following provides additional details regarding the disclosed subject matter.

In a first step 5-10, the user of the system selects from a plurality of options for describing workload resource requirements 2-60.

A first option is to extract the resource requirements 2-60 from a plurality of database and application log files 2-10 (and also 1-10), by identifying the file system locations of relevant log files 5-20, the type of data within the log file 5-21, and the time period of interest 5-22. With this information, the system extracts information about the resources used 5-23 to process the data of interest 5-21 over the time period of interest 5-22. In one embodiment, the step of identifying relevant type of data 5-21 is guided by providing a plurality of database query templates, which are matched against the queries actually occurring in the log files of interest 5-20. In one embodiment, the step of identifying the time period of interest 5-22 is performed by specifying a list of temporal ranges and considering only those log entries that occurred within a specified temporal range. In one embodiment, the extraction step 5-23 operates by means of regular expression matching. In another embodiment, the extraction step 5-23 operates by parsing the log file formats.

A second option is to extract the resource requirements 2-60 from a database of historical query performance 2-30. In one embodiment, this database 2-30 can be queried via SQL to extract the resource requirement 2-60 used by the queries in the database 2-30.

A third option is to monitor the operation of certain software applications 2-20, e.g., by identifying the applications of interest 5-30, identifying the actions of interest 5-31, and identifying the time periods of interest 5-32. With this information, an ODBC or JDBC proxy 2-25 can be inserted between the software applications 2-20 and their databases. This proxy 2-25 forwards database requests emitted by the software applications 2-20 to their target databases, but also analyzes the database requests for the actions of interest 5-31 and time periods of interest 5-32 in step 5-33 to assess and extract their resource requirements 2-60.

In one embodiment, the analysis and extraction step 5-33 produces query plans against actual or simulated data, and uses the query plans to predict resource requirements. In one embodiment, the proxy 2-25 also measures the time between forwarding the query to the target database and receiving a reply, and uses this duration to measure the actual time required to perform the query. In one embodiment, the proxy 2-25 also tracks an application 2-20 session identifier and uses this information to measure the number of concurrent requests over periods of time.

A fourth option is to describe a workload by identifying queries of interest 5-40 operating against data of interest 5-41. In one embodiment step 5-41 comprises a collection of database queries whose results include the data of interest. In cases where actual data values must be private, an embodiment of step 5-41 may characterize the data by identifying the amount of data, the number and types of data values, the number of distinct values of each type of data, histograms of data values, correlations (such as the Pearson correlation) between data values, functional dependencies, partitioning, and ordering. In step 5-43, the queries identified in 5-40 and the data identified in step 5-41 are processed by a workload simulator 2-200, to simulate the resources requirements 2-60. In one embodiment, the workload simulator 2-200 is also provided with desired SLAs 2-70, and can be run iteratively with different levels of resources 2-60 until optimized for the SLAs 2-70.

As also described, the resource extraction steps 5-23, 5-33 and 5-43 operate against query plans and query performance results. As depicted in FIG. 7, query plans comprise a plurality of stages (7-140 and 7-200) with each stage comprising a plurality of operations of differing types. Each stage preferably executes on a particular computational node, with network exchange of data between stages.

In one embodiment, query operation types include sequential scans, indexed scans, hash joins, merge joins, nested loop joins, unions, intersections, differences, sorts, groups, aggregations, projections, filters, and sub-plans. Each query operation produces estimated and actual numbers of rows resulting from the application of the query operation, each such row consisting of estimated and actual average numbers of bytes, at estimated and actual costs as measures of query execution time.

In this embodiment, resource requirements are derived from the steps of the query plan. For example, the sequential scan in 6-20 is estimated to produce 8 million rows, averaging 1K bytes each, for a total of 8 gigabytes of data. The time required to scan this much data can be estimated given the read speed of magnetic disks or SSDs. Alternatively, if the time T allowed for the sequential scan operation is constrained by an SLA, then the disk-resource required must be able to scan at a rate of 8 GB/T or faster.

In most situations, an SLA will describe performance requirements at the level of a database query or workload, and not at the level of a database operation like a sequential scan. Nevertheless, because the estimated cost of the sequential scan is a percentage P of the total cost of the query, a latency of T seconds for the whole query desired by an SLA can still be used to derive required disk speed, e.g., by dividing #bytes read (8 GB in 6-20) by T*P.

In similar fashion, the amount of memory required may be calculated as the maximum size of any materializing database operation. Materializing operations comprise sorts, results of sub-plans, hash tables, and explicit materializations. As before, the size is the product of the number of rows resulting from a database operation and the average row size.

In similar fashion, network bandwidth requirements may be calculated by examining the topmost operation in any stage, or from an explicit network operation.

Once the resource usage requirements 2-60 have been identified, they can be mapped onto a vector space in step 5-50, where each type of resource forms a dimension in the vector space, and where the durations of resource utilization are mapped onto a temporal dimension.

In one embodiment, there are a plurality of resource types comprising number of CPU cores, CPU speed, GPU and GPU memory, amount of RAM, RAM speed, number of CPU cache levels, size of CPU cache levels, speed of accessing CPU cache levels, SSD size, SSD access speed, number magnetic disks, disk capacity, random access read time, streaming read bandwidth, IOPS, network bandwidth and latency.

A cluster analysis step 5-60 follows after the construction of the resource utilization vector space 5-50. In a simple embodiment, all resource utilization vectors are included into a single cluster. In an alternative embodiment the cluster analysis starts by placing each vector into its own cluster; and then computes the dot product of all pairs of vectors, as an estimate of the distance between the vectors. The clusters containing the two vectors separated by the smallest distance are merged into a single cluster. This operation is performed iteratively, preferably with an iteration reducing the number of clusters by one, until there remains a single cluster containing all the vectors. After an iteration, the clustering step 5-60 may estimate the resource-bundles required to match the requirements of each cluster, finally choosing the particular clustering that minimizes the cost of the resource-bundles.

The result of step 5-60 is combined with the available resource-bundling options 2-50, SLA 5-78 and desired cost 2-75 within the provisioning optimizer 2-300 over steps 5-80, 5-90, and 5-100 in order to optimize provisioned clusters of virtual nodes that provide the resources needed to meet the requirements of the clusters in step 5-60.

Variants

Typically, each customer utilizes one or more workload engines to fulfill their analytic pipeline needs. Preferably, the platform service provider assists its customers in intelligently selecting the workload engines needed to cater for the combination of workload and SLA, and the sizing of the cloud (cluster) needed to ensure the appropriate price performance optimization. The techniques described above provide one technique to facilitate this process. There may be variants of this automated technique, as are now described.

Figure 8:
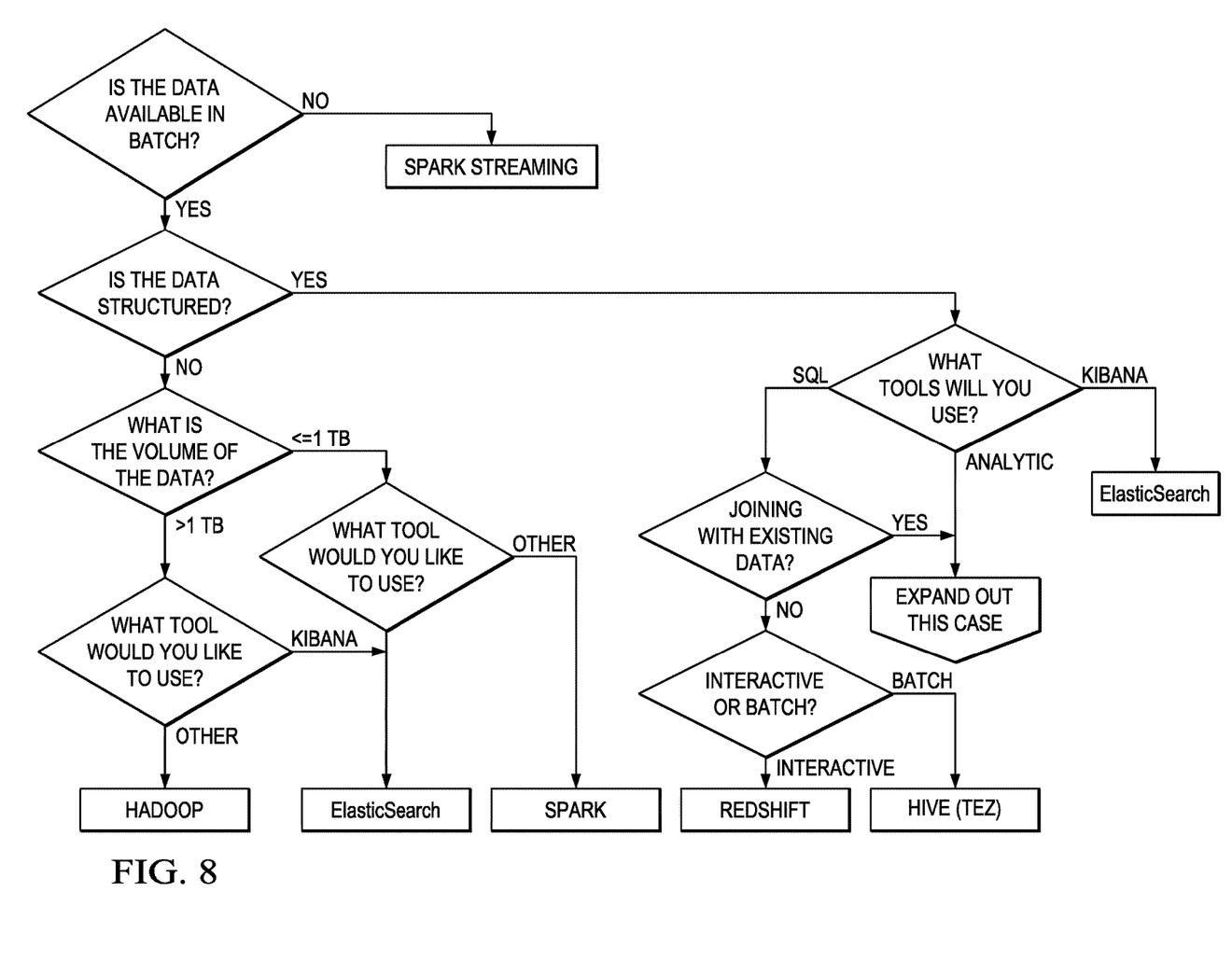
FIG. 8 illustrates a decision tree that provides an example of a deterministic workload engine determination process according to an alternative embodiment.

A deterministic approach may be used, such as shown in FIG. 8. For example, inputs that may drive this process include: the data that is needed for the analytic process; the tools that will be used to interact with the data; and business SLA that governs the analytic process. One approach to initially tackling this problem is to have a simple deterministic approach to choosing the workload engine. For example, the platform may support a given set of workload engines, such as Hadoop with Hive on Tez, RedShift, and ElasticSearch. Because of the wide difference in the capabilities of these engines, the service provider can make static decisions deterministically in a matrix fashion, using a decision tree such as shown. A characteristic that is not currently accounted for by the decision tree is whether the workload is scan or compute driven. This might further drive the choice of the workload engine. The particular details of this decision tree are not intended to be limiting.

A skilled person will appreciate that sizing a SQL cluster based on an existing system typically requires the extraction of parameters and statistics from the existing system(s). At a minimum this should contain: schema statistics (table/row sizes, and compression characteristics), as well as query statistics (execution plans). Obtaining these characteristics might not be tenable at some customers; in such case, preferably initial cluster sizing can be crude (coarse), ensuring merely that the data volume can be catered for; SLA management can then be accomplished by continuously monitoring the customer environment. This alternative approach is further described as follows.

In particular, preferably this capability will cater for assessing the appropriate platform for a customer. By performing continuous monitoring of a customer's workload, the service platform can assess if the platform has the appropriate capabilities and size to meet workload SLAs. The approach may be carried out on an on-going basis, thereby providing continuous value to the customer. In this variant, the process assesses the current workloads, data growth for the data sets that the workload executes on, as well as concurrency of the system, to determine if there the current platform needs to be right-sized for the current workload. As used herein, "right-sizing" means that the platform is expanded or contracted. An added capability would be to assess if there is a more appropriate workload engine that could be used for the current combination of data, workload and SLA. The movement from the current engine to the proposed one is then accomplished by the service provider. For example, the customer may start off on Hadoop but as the number of workloads increases the cost per query might shift towards Redshift being the better option.

As example scenarios, the following provides additional details for Hadoop versus RedShift sizing for the continuous monitoring scenario.

For Hadoop, the model inputs are the total data size and the time allowed for a full scan of the data. Given some rough-sizing like the model, the service provider makes a first suggestion about cluster size. Then, the provider monitors to determine whether the cluster is the right size. In this case, "right size" is a size that handles the workload without significant queuing delays and within the available resources. By continuous (or periodic or on-demand) monitoring, the provider can reach an understanding, for example, if the cluster is under-utilized to the point where the next size down would be sufficient. For example, if the service provider provisions a "Large" cluster and then finds that the workload and data size would fit in a "Medium with no more than K % over-utilization," it could suggest a down-sizing. Preferably, monitoring involves actual data size, scheduling delay (queries submitted that are waiting because there are no available resources), resource (e.g., memory, I/O, CPU, etc.) utilization (resources used by running queries as well as resource queuing delays). In Hadoop, there are several singleton components that need to be sized properly. Most important is the name node—a single point of control for the distributed file system (HDFS). The only remedy for name node saturation is a larger instance. Typically, the system scales linearly by adding data nodes. Adding a data node adds memory, I/O, and CPU in fixed proportion.

Redshift supports two sets of workload profiles named "Basic" and "Extra Compute Intensive." Similar to Hadoop, the profile input values and the model can be validated and adjusted for specific data and workloads. Here, preferably the platform monitors: actual data size, transient data space usage, memory usage, CPU utilization, network (amount of the data distributed/broadcasted), disk-based hash and sort operations, literal equality/range predicates, join, grouping window partition and sort key columns, and WLM statistics. In addition to the cluster sizing, the system may recommend distribution/sort key changes.

On the monitoring framework, preferably moving averages are calculated and used to avoid influences from outliers and to detect trend changes reliably.

Each of the above-described functions may be implemented in a hardware processor, as a set of one or more computer program instructions that are executed by the processor(s) and operative to provide the described function.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, networking technologies, etc., that together provide the functionality of a given system or subsystem. As described, the functionality may be implemented in a standalone machine, or across a distributed set of machines.

The front-end of the above-described infrastructure (namely, the customer console or portal) is also representative of a web site (e.g., a set of one or more pages formatted according to a markup language). Interaction with the portal may also take place in an automated manner, or programmatically, and the portal may interoperate with other identity management devices and systems.

Typically, the services platform comprises a set of computing machines each provisioned with hardware, memory, operating system and other software components. Stored program-based functions as described are implemented on computer hardware or virtual machine resources.

Typically, the cloud computing environment has a set of high level functional components that include a front end identity manager, a business support services (BSS) function component, an operational support services (OSS) function component, and the compute cloud components themselves.

While the above description sets forth a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computing entity selectively activated or reconfigured by a stored computer program stored. Such a computer program may be stored in a computer readable storage medium, such as, but is not limited to, any type of disk including an optical disk, a CD-ROM, and a magnetic-optical disk, flash memory, a read-only memory (ROM), a random access memory (RAM), a magnetic or optical card, or any type of non-transitory media suitable for storing electronic instructions.

While given components of the system have been described separately, one of ordinary skill will appreciate that some of the functions may be combined or shared in given instructions, program sequences, code portions, and the like.

The techniques herein provide for improvements to another technology or technical field, namely, data analytics tooling, applications and systems, as well as improvements to cloud computing infrastructures that support such functions and technologies.

Having described our invention, what we claim is as follows.

The invention claimed is:

1. Apparatus associated with a cloud computing infrastructure, comprising:
   one or more hardware processors;
   computer memory holding computer program instructions executing in the one or more hardware processors, the computer program instructions operative to identify resources in the cloud computing infrastructure on which an analytics workload is to be executed by:
      mapping a set of workload resource requirements onto a resource vector space, the workload resource requirements being represented in the resource vector space as graphical objects;
      performing a cluster analysis on the graphical objects to identify, based on graphical objects that cluster with one another in the resource vector space as a group, one or more analytics workloads requiring similar resources in the cloud computing infrastructure;
      matching the set of workload resource requirements in a cluster against a set of resource bundling options available in the cloud computing infrastructure wherein at least one resource bundling option identifies a cloud vendor, and a description of types and amounts of resources provided in the resource bundling option; and outputting descriptions of one or more resource bundling options that, based on the matching, will support the analytics workload.

2. The apparatus as described in claim 1 wherein the workload resource requirements are generated from historical workload information.

3. The apparatus as described in claim 1 wherein the workload resource requirements are generated deterministically.

4. The apparatus as described in claim 1 wherein the resource bundling options are identified via an application programming interface (API).

5. The apparatus as described in claim 1 wherein the descriptions identify an ordered list of resource bundling options.

6. The apparatus as described in claim 5 wherein the ordered list includes a first entry that is a lowest cost option.

7. The apparatus as described in claim 6 wherein at least one entry in the ordered list also includes a probability of missing the service level.

8. Apparatus associated with a cloud computing infrastructure, comprising:

one or more hardware processors;

computer memory holding computer program instructions executing in the one or more hardware processors, the computer program instructions configured to identify resources in the cloud computing infrastructure on which an analytics workload is to be executed by:

mapping a set of workload resource requirements onto a resource vector space, the workload resource requirements being represented in the resource vector space as graphical objects;

performing a cluster analysis on the graphical objects to identify, based on graphical objects that cluster with one another in the resource vector space as a group, one or more analytics workloads requiring similar resources in the cloud computing infrastructure; and providing information specifying an initial cluster configuration of at least one cluster as determined by the cluster analysis;

wherein at least one vector in the resource vector space is associated with a resource bundling option that comprises a cloud vendor, and a description of types and amounts of resources provided in the resource bundling option.

9. The apparatus as described in claim 8 wherein the computer program instructions are further configured to monitor performance of the initial cluster configuration against a service level as an analytics workload is executing in the initial cluster configuration.

10. The apparatus as described in claim 9 wherein the computer program instructions are further configured based on monitored performance to provide supplemental information specifying a modified cluster configuration to thereby adjust the resources in the cloud computing infrastructure.

11. The apparatus as described in claim 8 wherein the workload resource requirements are generated from historical workload information.

12. The apparatus as described in claim 8 wherein the workload resource requirements are generated deterministically.

13. The apparatus as described in claim 1 wherein the set of resource bundling options describe available resource bundles, each resource bundle providing different amounts of different resources.

14. The apparatus as described in claim 13 wherein each resource bundling option is represented as a vector in the resource vector space.

15. The apparatus as described in claim 13 wherein the resource vector space is a multi-dimensional resource vector space.

* * * * *